J. KINSMAN, Sr.

Corpse Cooler.

No. 55,013.

Patented May 22, 1866.

Witnesses

Inventor
Jacob Kinsman
Munn & Co
Attorneys

UNITED STATES PATENT OFFICE.

JACOB KUNSMAN, SR., OF READING, PENNSYLVANIA, ASSIGNOR TO HIMSELF AND FREDERICK J. NAGLE, OF SAME PLACE.

IMPROVEMENT IN APPARATUS FOR PRESERVING DEAD BODIES.

Specification forming part of Letters Patent No. 55,013, dated May 22, 1866.

*To all whom it may concern:*

Be it known that I, JACOB KUNSMAN, Sr., of Reading, in the county of Berks and State of Pennsylvania, have invented a new and Improved Apparatus for Preserving Dead Bodies; and I do hereby declare that the following is a full, clear, and exact description thereof, which will enable those skilled in the art to make and use the same, reference being had to the accompanying drawings, forming part of this specification, in which—

Figure 1:
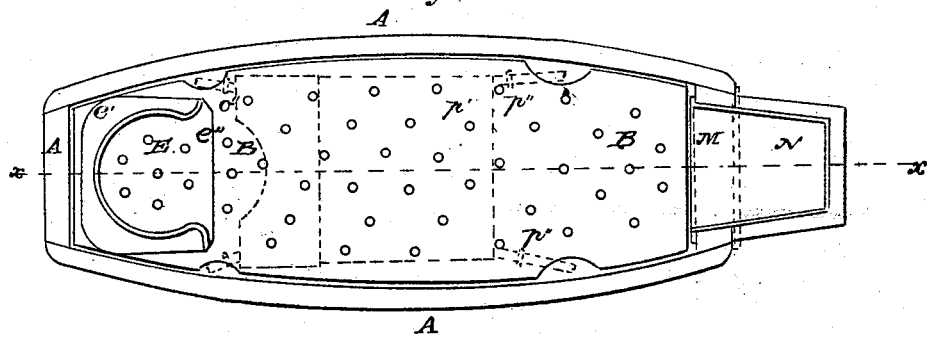
Figure 2:
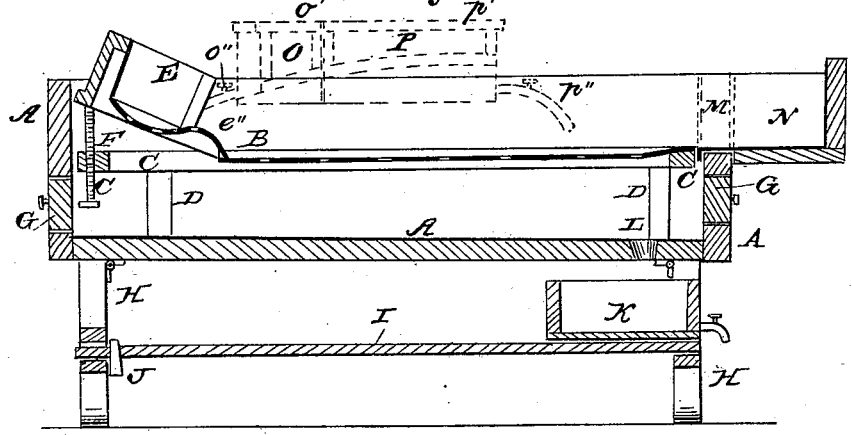

Figure 1 is a top or plan view of my improved apparatus, showing in red lines the relative position of the neck and body boxes when used. Fig. 2 is a vertical longitudinal section of the same through the line $xx$, Fig. 1.

Similar letters of reference indicate corresponding parts.

My invention has for its object the furnishing an apparatus by the use of which the bodies of the dead may be preserved from decomposition, even in the warmest weather or climate, until such time as it may be convenient to place them in coffins for interment; and it consists, first, in combining a perforated supporting-plate with the box; second, in combining a perforated adjustable head-support with the box and with the perforated supporting-plate; third, in combining a neck-box provided with exhaust-pipes and stop-cocks with the supporting-plate and with the box; fourth, in combining exhaust-pipes, stop-cocks, and a lid with the body-box and supporting-plate; fifth, in combining with the box a detachable part for lengthening the box when required; sixth, in combining with the box the hinged legs, for convenience in transportation; seventh, in combining with the hinged legs and with the box a board or shelf, to be used as a brace to hold the hinged legs in position as a table for dressing the body and as a lid or cover for the box in transportation; eighth, in combining a trough or receptacle provided with an exhaust-pipe and stop-cock with the box, for receiving the water from the box; and ninth, in combining end doors with the box, as hereinafter more fully set forth.

A is the box. B is a perforated supporting-plate attached to a frame, C. This plate B extends from the foot of the box A to about the place where the neck of a corpse would naturally come; and it may be made of metal and painted, or it may be made of any other suitable material. The perforations through this plate should be sufficiently numerous to readily carry off all water that may flow upon it.

The frame C rests upon supports or cleats D, attached to the box A, as shown in Fig. 2. The head-support E consists of a metallic perforated lining attached to and supported on three sides by a box or frame, $e'$, as shown in the drawings. The head end of the support E rests upon a screw, F, passing through the frame C, as shown in Fig. 2, by which it may be raised or lowered as required. The front end, $e''$, rests upon the plate B, as shown.

G G are doors closing openings in the head and foot of the box A below the plate B, by which access may be had to the interior of the box for the insertion of ice, or to see that the vent-hole for the discharge of the water is free, or for any other necessary purpose. H H are legs hinged to the box A, as shown in Fig. 2, for convenience in supporting the box. I is a board which, when placed in the position represented in Fig. 2, acts as a brace, securing the legs H in position and guarding against the falling of the apparatus, but which is also designed to be used as a table for dressing the corpse, and also is a lid or cover to the box during transportation. When used as a brace the board I is kept in position by the wedge J.

K is a box or trough resting upon the brace I, to receive the water as it escapes from the box A through the vent-hole L.

M is a portion of the foot of the box A, which is made removable, so that it may be removed for the attachment of the extension N. In the case of short bodies the box A is used without the part N; but in the case of long bodies the part M is removed and the part N attached, the flanges of the metallic lining of which grasp the edges of the end of the box A, as shown in Fig. 1.

O is the neck-box, which is made in the form represented in the drawings, so as to fit closely around the throat and chin of the corpse. It is provided with a lid, $o'$, and with exhaust-pipes and stop-cocks $o''$, for letting off the water from the box O when it may be considered advisable. The pipes $o''$ lead into cavities between the frame C and the box A, through which the water flows into the lower part of the box A.

P is a box formed to fit over the lower part of the body, and which is furnished with a lid or cover, P', and with exhaust-pipes and stop-cocks P'', by means of which the water may be drawn off into the lower part of the box A, the pipes P'' leading into orifices formed between the frame C and the side of the box A, as shown.

In using the apparatus, I set up the box A, place the plate B and support E in the proper positions, and attach the extension N, if necessary. Then I place the body upon the frame, and support and allow it to remain there undisturbed until the friends of the deceased are fully satisfied that death has really taken place. I then place pieces of ice around the body, between it and the side walls of the box and around the neck and cheeks of the corpse, applying to or wrapping the body in cloths wet in a solution of saltpeter, when necessary. I thus avoid placing the body directly upon the ice, which is so strongly objected to by the friends of deceased persons.

The boxes O and P are only used where ice is unattainable. In this case I fill the boxes O and P with cold water by removing the covers o' and P', and as fast and as often as it becomes warm I draw it off by the pipes o'' and P'', replacing it with cold water. In this way, simply by the use of cold water, I am able with this apparatus to preserve the bodies as long as may be necessary.

I claim as new and desire to secure by Letters Patent—

1. The combination of the perforated supporting-plate B with the box A, substantially as described, and for the purpose set forth.

2. The combination of the perforated adjustable head-support E with the perforated plate B and the box A, substantially as described, and for the purpose set forth.

3. The combination of the neck-box O, provided with a cover, o', and exhaust-pipes and stop-cocks o'', with the perforated plate B and box A, substantially as described, and for the purpose set forth.

4. The combination of the detachable part N with the box A, substantially as described, and for the purpose set forth.

5. The combination of the board or shelf I with the hinged legs H and with the box A, substantially as described, and for the purpose set forth.

The above specification of my invention signed by me this 18th day of November, 1865.

JACOB KUNSMAN, Sr.

Witnesses:
M. M. LIVINGSTON,
JAMES T. GRAHAM.